No. 797,499. PATENTED AUG. 15, 1905.
J. B. CORNWALL.
GRAIN SIEVE CLEANER.
APPLICATION FILED JAN. 8, 1904.
2 SHEETS—SHEET 1.
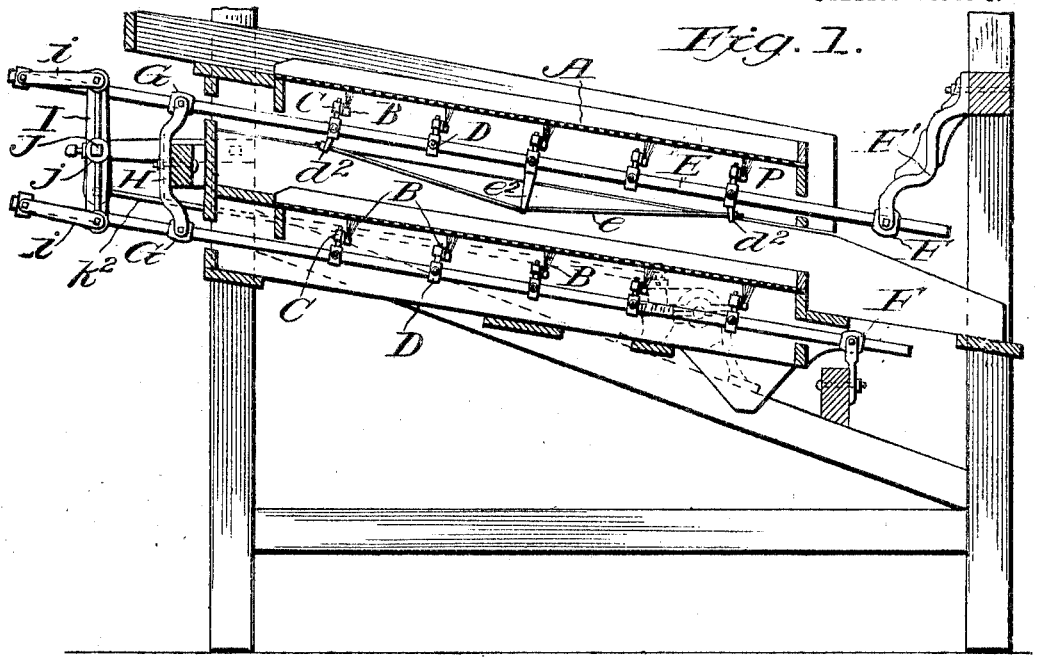
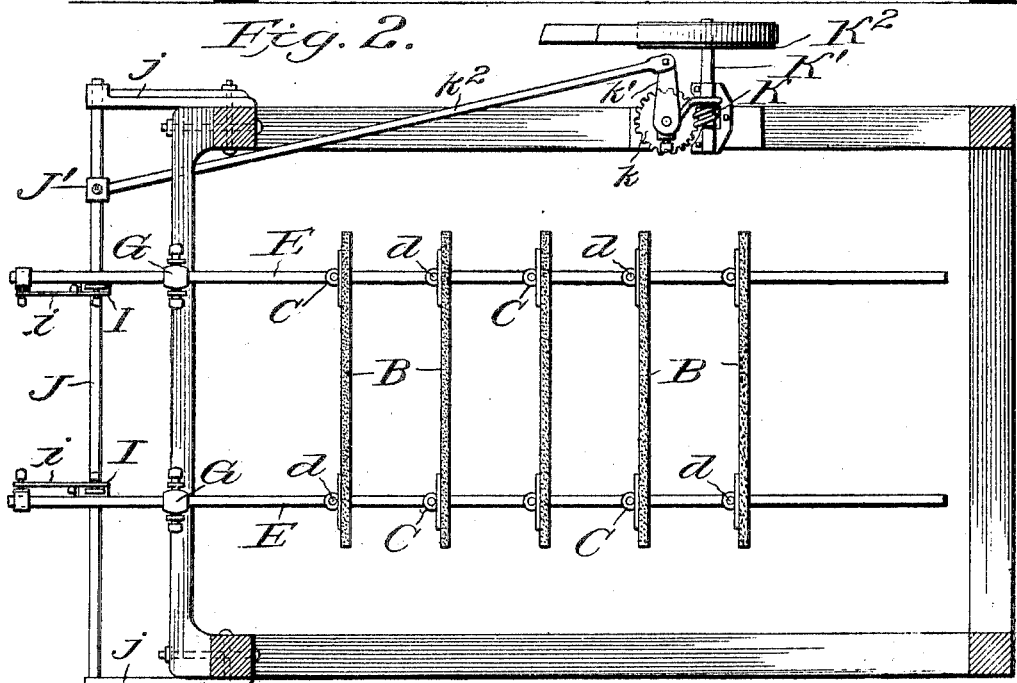

No. 797,499. PATENTED AUG. 15, 1905.
J. B. CORNWALL.
GRAIN SIEVE CLEANER.
APPLICATION FILED JAN. 8, 1904.
2 SHEETS—SHEET 2.
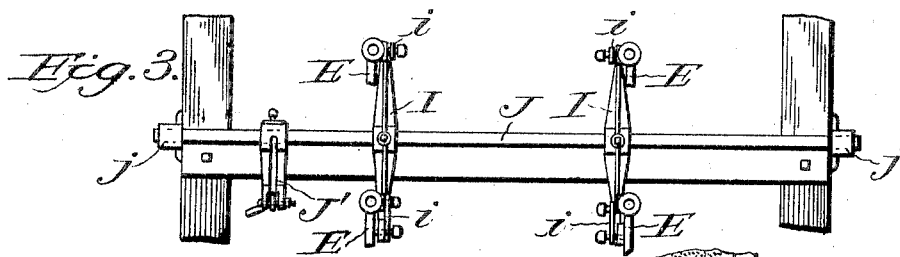
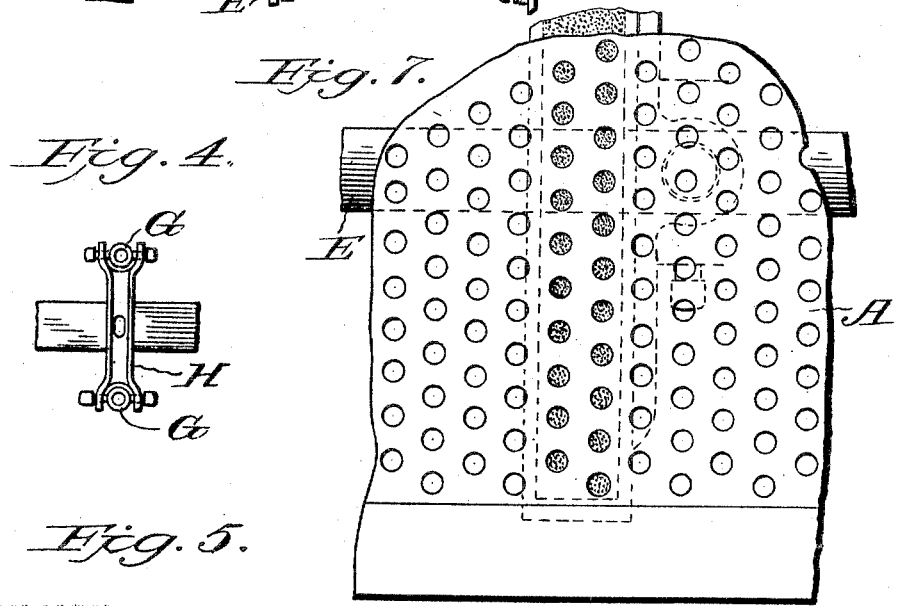
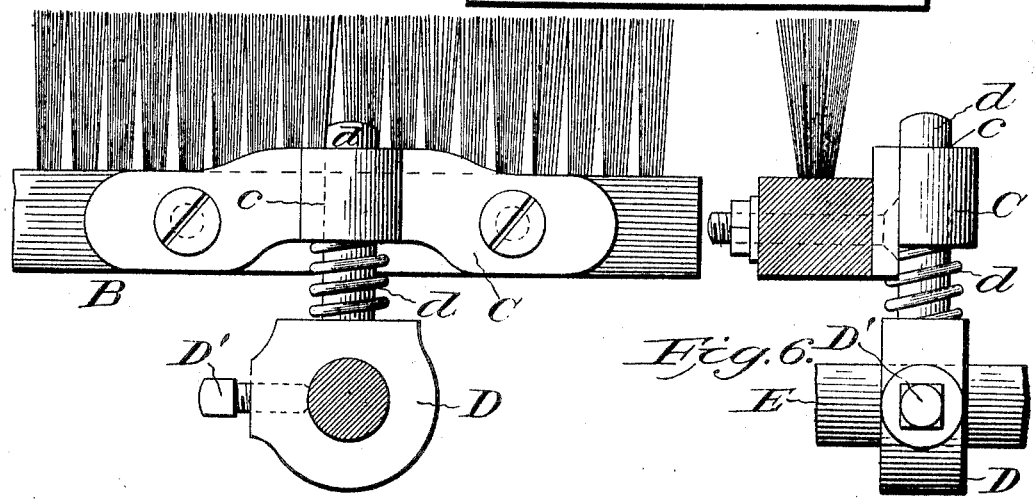
WITNESSES:
C. H. Walker
James R. Mansfield
INVENTOR.
John B. Cornwall
BY
Alexander & Dowell
Attorneys

UNITED STATES PATENT OFFICE.

JOHN B. CORNWALL, OF MOLINE, ILLINOIS, ASSIGNOR TO THE BARNARD AND LEAS MANUFACTURING COMPANY, OF MOLINE, ILLINOIS.

GRAIN-SIEVE CLEANER.

No. 797,499.      Specification of Letters Patent.      Patented Aug. 15, 1905.

Application filed January 8, 1904. Serial No. 188,216.

*To all whom it may concern:*

Be it known that I, JOHN B. CORNWALL, of Moline, in the county of Rock Island and State of Illinois, have invented certain new and useful Improvements in Grain-Sieve Cleaners; and I hereby declare that the following is a full, clear, and exact description thereof, reference being had to the accompanying drawings, which form part of this specification.

This invention is an improved apparatus for cleaning sieves, particularly applicable to the reciprocating sieves of grain cleaning or separating machines; and its object is to provide a more efficient and practically useful sieve-cleaning apparatus than those heretofore known and to make such apparatus simple, light, and readily adjustable or attachable to machines now in use.

The invention comprises novel means for yieldingly supporting the brushes or cleaners and novel means for reciprocating or shifting the same, and I refer to the claims appended to the description of the apparatus illustrated in the accompanying drawings for summaries of the features of the invention for which protection is desired.

The drawings forming part of this specification illustrate the best form of the apparatus now known to me, and I will describe the invention as illustrated therein.

Figure 1 is a longitudinal sectional elevation through part of a grain-separator, showing two sieves and my improved sieve-cleaning apparatus applied thereto. Fig. 2 is a detail top plan view of the cleaning apparatus. Fig. 3 is a rear view thereof. Fig. 4 is a detail of one of the rod-guides. Fig. 5 is an enlarged view of one of the cleaner-supports. Fig. 6 is an end view of Fig. 5, and Fig. 7 is a detail plan view showing a brush-cleaner in position beneath a perforated screen.

In the machine indicated in the drawings there are two sieves or screens A A', one above the other. These sieves are of ordinary construction and may be either stationary or reciprocating, the construction and mode of mounting the sieves being immaterial and forming no part of the present invention.

Beneath the upper sieve A is a series of equidistant transversely-disposed cleaners B, which may be of any suitable kind, such as strips of leather, rubber, bristles, or wire. Brush-cleaners are shown in the drawings; but I do not restrict myself thereto. The cleaners are provided with castings C, fastened to their sides and provided with vertical apertures $c$ for the reception of supporting-studs $d$, attached to collars D, strung on rods E, two or more parallel rods E being arranged beneath the sieves and brushes and supported in suitable guides at the ends of the screen. The collars D may be adjustably secured by tap-bolts D', and helical springs $d'$ are strung on studs $d$ between collars D and casting C, so as to yieldingly support the cleaners on rods E. Yieldingly supporting the cleaners beneath the sieves I consider a valuable feature of my invention.

A sufficient number of cleaners B are employed for each screen to insure proper cleaning thereof, the number and distance apart of the cleaners depending upon the size of the screen and the extent of lateral movement of the cleaners relative to the screen. The rods are supported at their rear ends in guide-sleeves F, which may be hung in brackets F', attached to an adjacent part of the machine-framing. The forward ends of the rods extend through guide-sleeves G, hung in brackets H, attached to an adjacent part of the framing. The forward ends of rods E are connected by links $i$ to crank-arms I on a transverse rock-shaft J, journaled in brackets $j$, attached to the framing, and said rock-shaft is oscillated slowly by means of a crank-arm J', connected by a pitman $k^2$ to a crank $k'$ on a worm-gear $k$, journaled on a stub-shaft attached to a suitable portion of the frame and meshing with a worm K on a stub-shaft K', having a pulley K², by which it can be belted to a driver. (Not shown.) I do not restrict myself to the specific driving mechanism shown, but prefer the worm-drive for reciprocating the brushes, as it enables me to reduce the speed of reciprocation of the cleaners to the desired extent without using very large gears. Where a number of cleaners are mounted on the rods E, the latter can be stiffened by means of the truss-rods $e$, attached to lugs $d^2$ on the end collars D and having intermediate struts $e^2$, as shown.

A similar set of cleaning devices is arranged beneath the lower screen A', the rods E of the lower cleaners being connected to depending crank-arms I on shaft J, so that the upper and lower sets of cleaners move in opposite directions.

Operation: Motion being imparted to shaft K, worm-gear $k$ through rod $k^2$ imparts a rocking motion to shaft J, and the latter, through arms I, imparts a reciprocating motion to rods E E, which move the cleaners B back and forth under the sieves. The cleaners are thus moved a suitable distance back and forth under the screen, so that the entire surface of the latter will be cleaned by the action of the several cleaners. The springs $d'$ hold the cleaners up against the sieve with uniform but yielding pressure and permit them to pass under any obstacle which may catch in or adhere to the under surface of the sieve, thus preventing the cleaners tearing the sieve or being themselves injured.

With some kinds of sieves or some classes of work it is best to use bristle-brushes; with others, to use wire brushes or leather or rubber strips. All of these kinds of cleaners are well known, and therefore I do not restrict myself to any one of them.

I do not claim, broadly, the use of reciprocating underrunning-cleaners; but

What I do claim as new, and desire to secure by Letters Patent thereon, is—

1. In combination, a sieve, a pair of longitudinally-arranged rods thereunder, means for longitudinally reciprocating said rods slowly independently of the sieve; adjacent vertically-disposed studs attached to the rods, transversely - arranged vertically - movable cleaners guided on said studs, and springs strung on the studs below the cleaners yieldingly pressing the cleaners upward into contact with the sieve, substantially as described.

2. In combination, a sieve, parallel rods thereunder, adjacent parallel upstanding studs fixed on said rods, transversely - arranged cleaners, castings attached to said cleaners and loosely strung on and guided by the studs, and springs strung on the studs between the castings and rods and pressing the cleaners yieldingly against the sieve.

3. In a sieve-cleaning device, the combination of a sieve, parallel rods thereunder, collars affixed to said rods, vertical studs attached to said collars, movable cleaners loosely mounted on and guided by the studs, and springs interposed between the cleaners and collars and holding the cleaners yieldingly against the sieve, substantially as described.

4. In a sieve-cleaning device, the combination of a sieve, parallel reciprocating rods thereunder, collars adjustably attached to said rods, vertical studs attached to said collars, screen-cleaners, guide-castings attached to said cleaners and provided with apertures transfixed by said studs to guide the cleaners, helical springs strung on the studs between the castings and collars, and means for reciprocating the rods, substantially as and for the purpose described.

In testimony that I claim the foregoing as my own I affix my signature in presence of two witnesses.

JOHN B. CORNWALL.

In presence of—
STEPHEN D. RAY,
HARRY R. JOSEPH.